United States Patent [19]
Shmagin et al.

[11] Patent Number: 5,875,052
[45] Date of Patent: Feb. 23, 1999

[54] OPTICAL INFORMATION STORAGE SYSTEMS AND METHODS USING HETEROSTRUCTURES COMPRISING TERNARY GROUP III-V NITRIDE SEMICONDUCTOR MATERIALS

[75] Inventors: Irina K. Shmagin, Raleigh; John F. Muth, Cary; Robert M. Kolbas, Raleigh, all of N.C.

[73] Assignee: North Carolina State University, Raleigh, N.C.

[21] Appl. No.: 924,567

[22] Filed: Sep. 5, 1997

[51] Int. Cl.[6] .................................................. G11C 13/04
[52] U.S. Cl. .......................... 359/244; 359/248; 365/114; 365/215
[58] Field of Search ................................... 365/111, 114, 365/215; 359/7, 244, 248

[56] References Cited

U.S. PATENT DOCUMENTS

| | | | |
|---|---|---|---|
| 5,499,206 | 3/1996 | Muto | 365/114 |
| 5,508,829 | 4/1996 | Freeouf et al. | 359/3 |
| 5,521,398 | 5/1996 | Pelekanos et al. | 257/17 |
| 5,679,152 | 10/1997 | Tischler et al. | 117/97 |

OTHER PUBLICATIONS

Beadie et al., "Persistent Photoconductivity in n–Type GaN", Appl. Phys. Lett., 71 (8), 25 Aug. 1997, pp. 1092–1094.

Qiu et al., "Deep Levels and Persistent Photoconductivity in GaN Thin Films", Appl. Phys. Lett. 70 (15), 14 Apr. 1997, p. 1983.

Hirsch et al., "Persistent Photoconductivity in n–type GaN", Appl. Phys. Lett., 71 (8) 25 Aug. 1997, pp. 1098–1100.

Shmagin et al., "Optical Metastability in Bulk GaN Single Crystals", Appl. Phys. Lett., 71 (4), 28 Jul. 1997, pp. 455–457.

Joshkin et al., "Optical Memory Effect in GaN Epitaxial Films", Appl. Phys. Lett., 71, 1997.

Primary Examiner—Georgia Epps
Assistant Examiner—Margaret Burke
Attorney, Agent, or Firm—Myers Bigel Sibley & Sajovec

[57] ABSTRACT

Spatially localized radiation, preferably ultraviolet visible radiation, representing information is impinged onto a spatially localized area of a heterostructure comprising a ternary Group III–V Nitride semiconductor material. It has been found that the spatially localized optical radiation reversibly changes the properties of the heterostructure comprising ternary Group III–V Nitride semiconductor material in the spatially localized area, to thereby provide an optical memory. The stored information can be read from the memory by impinging blanket radiation, preferably ultraviolet radiation of the same frequency which was used to write the information, onto the heterostructure comprising ternary Group III–V Nitride semiconductor material including onto the spatially localized area thereof. Simultaneously, the changes in the properties of the heterostructure comprising ternary Group III–V Nitride semiconductor material in the spatially localized area as a result of the impinged blanket radiation are detected, to thereby read the information. Thus, high density, high contrast patterns can be written in spatially localized areas of a heterostructure comprising ternary Group III–V Nitride semiconductor material with ultraviolet light at room temperature and at cryogenic temperatures.

37 Claims, 5 Drawing Sheets

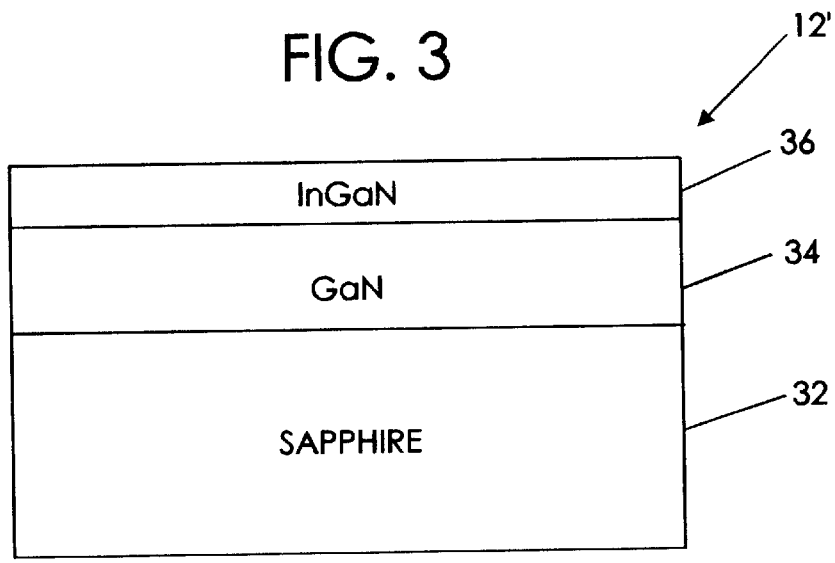
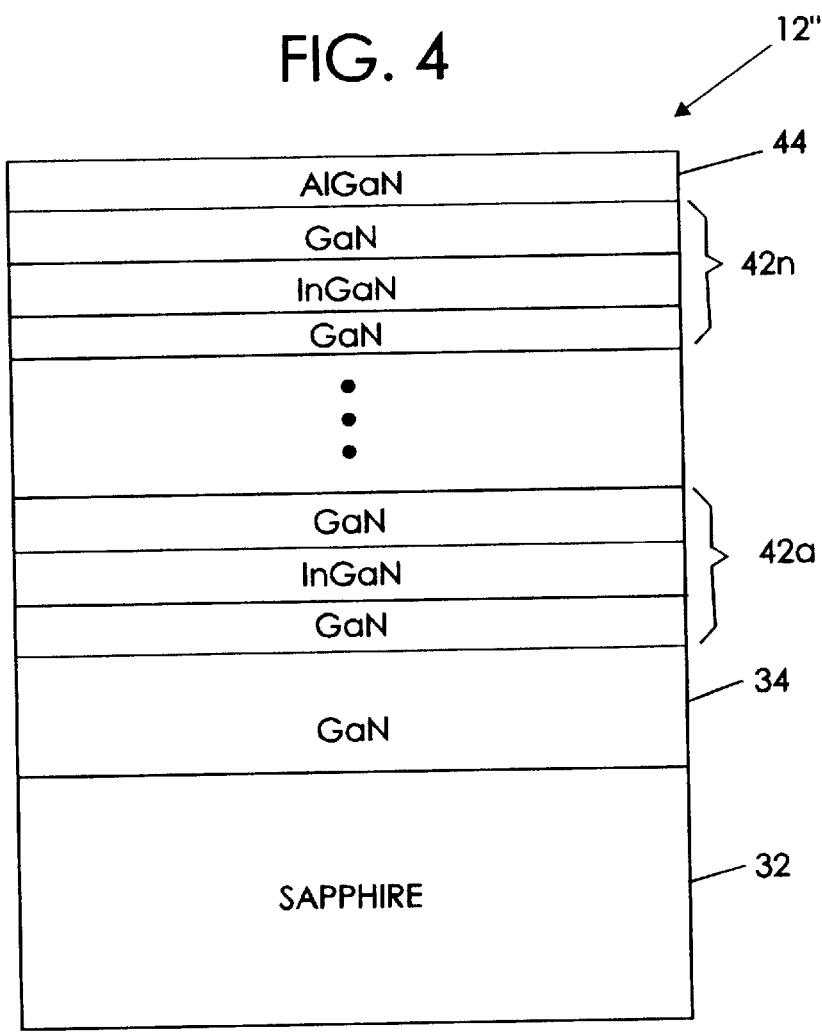

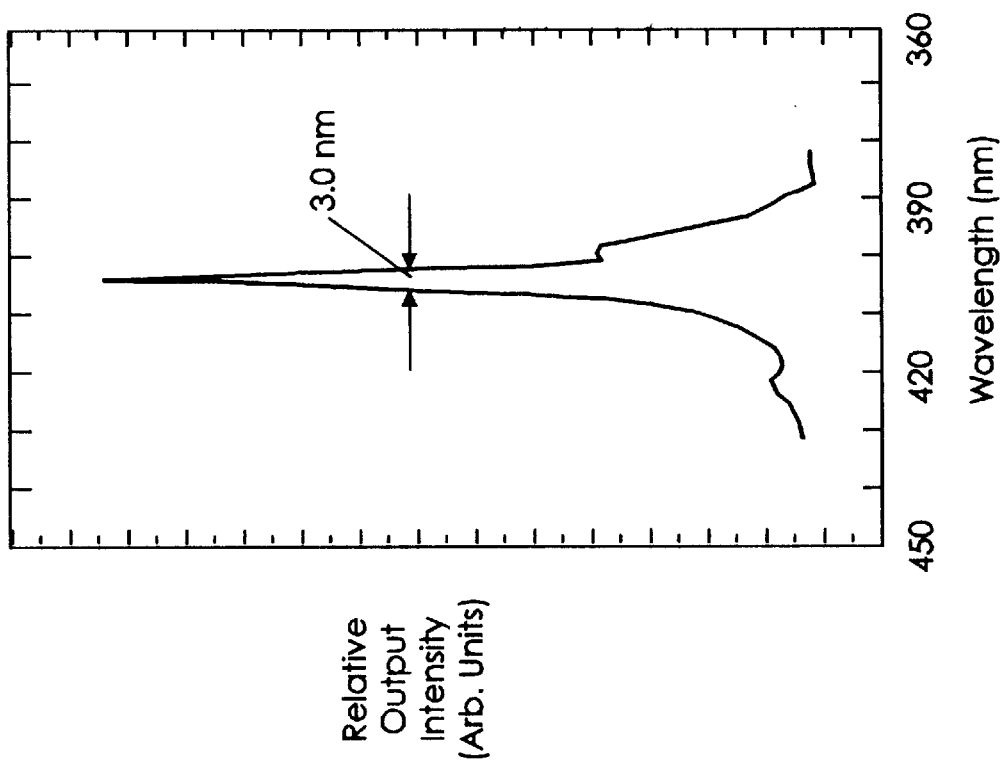
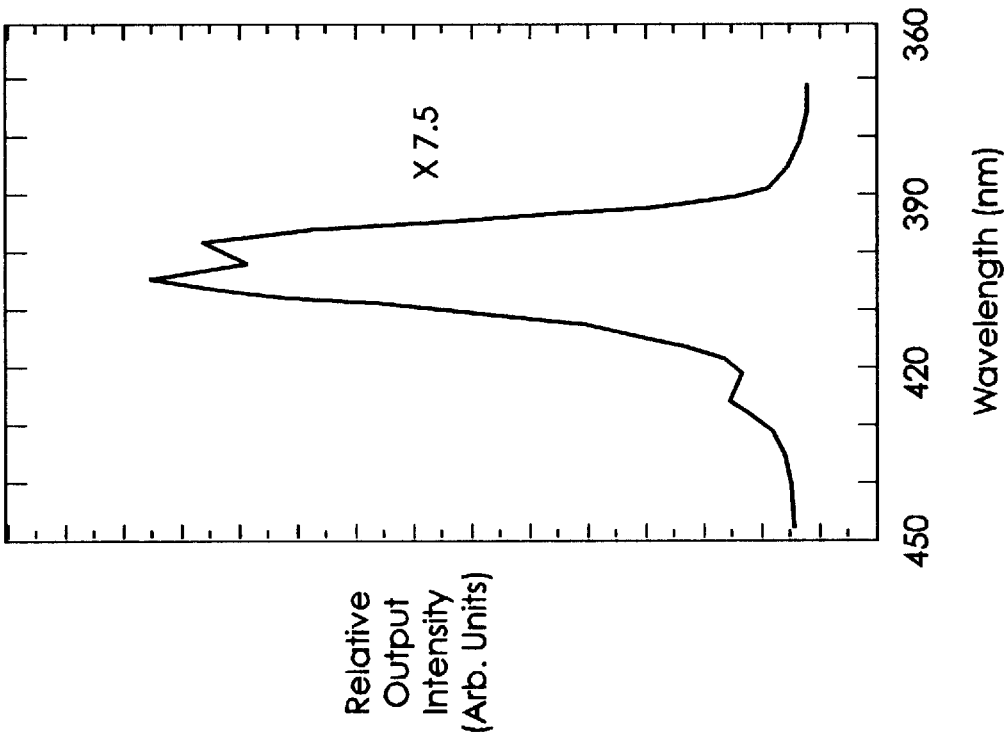

OPTICAL INFORMATION STORAGE SYSTEMS AND METHODS USING HETEROSTRUCTURES COMPRISING TERNARY GROUP III-V NITRIDE SEMICONDUCTOR MATERIALS

FIELD OF THE INVENTION

This invention relates to information storage systems and methods, and more particularly to optical information storage systems and methods.

BACKGROUND OF THE INVENTION

Information storage systems are widely used in consumer and industrial products. In addition to conventional storage devices, optical information storage has been widely investigated for potentially low cost, high density storage. Moreover, optical storage can also be used as a component of spatial light modulators, optical switches and reconfigurable optical interconnects.

Optical storage generally relies on persistent effects of an optical medium. In this regard, persistent effects have been studied in wide bandgap semiconductors. For example, persistent photoconductivity has been observed in P and N-type Gallium Nitride, as described in publications entitled "*Persistent Photoconductivity in n-Type GaN*" to Beadie et al., Applied Physics Letters, Vol. 71, No. 8, 25 Aug. 1997, pp. 1092–1094 and "*Deep Levels and Persistent Photoconductivity in GaN Thin Films*"to Qiu et al., Applied Physics Letters, Vol. 70, No. 15, 14 Apr. 1997, pp. 1983–1985. Optical metastability in bulk Gallium Nitride single crystals have also been observed, as described in a publication by Shmagin et al., entitled "*Optical Metastability in Bulk GaNSingle Crystals*", to Shmagin et al., Applied Physics Letters, Vol. 71, No. 4, 28 Jul. 1997, pp. 455–457. Finally, optical memory effects have also been seen in Gallium Nitride epitaxial thin films that have distinct morphological features. See the publication entitled "*Optical Memory Effect in GaN Epitaxial Films*", to Joshkin et al., Applied Physics Letters, Vol. 71, p. 234 (1997).

SUMMARY OF THE INVENTION

Information storage methods and optical systems are provided, according to the present invention, by impinging spatially localized optical radiation, preferably ultraviolet or visible radiation, representing information onto a spatially localized area of a heterostructure comprising ternary Group III–V Nitride semiconductor material. It has been found that the spatially localized optical radiation reversibly changes the properties of the heterostructure comprising ternary Group III–V Nitride semiconductor material in the spatially localized area, to thereby provide an optical memory. The stored information can be read from the memory by impinging blanket radiation, preferably radiation of the same frequency which was used to write the information, onto the heterostructure comprising ternary Group III–V Nitride semiconductor material including onto the spatially localized area thereof. Simultaneously, the changes in the properties of the heterostructure comprising ternary Group III–V Nitride semiconductor material in the spatially localized area as a result of the impinged blanket radiation are detected, to thereby read the information.

It has been found, according to the invention, that high density, high contrast patterns can be written in spatially localized areas of a heterostructure comprising ternary Group III–V Nitride semiconductor material, using ultraviolet light at room temperature and at cryogenic temperatures. After the pattern is erased, it appears that new information can be written on the same spatially localized area, without degradation in efficiency or retention time. The written information persists for many hours at room temperature, and for much longer at cryogenic temperatures. The persistence does not appear to be related to the morphological structure of the sample surface or to be the result of surface damage to the semiconductor material.

Preferably, the heterostructure comprising ternary Group III–V Nitride semiconductor material comprises a single heterostructure or a multiple heterostructure comprising ternary Group III–V Nitride semiconductor material. The single heterostructure is preferably a heterostructure of Indium Gallium Nitride and Gallium Nitride. The multiple heterostructure is preferably a multiple quantum well of Indium Gallium Nitride and Gallium Nitride.

More particularly, the single heterostructure preferably comprises a substrate, such as sapphire or silicon carbide, a first layer comprising Gallium Nitride on the substrate and a second layer comprising Indium Gallium Nitride on the first layer opposite the substrate. The multiple heterostructure preferably comprises a substrate, a first layer comprising Gallium Nitride on the substrate, a multiple quantum well heterostructure of Indium Gallium Nitride and Gallium Nitride on the first layer, and a second layer comprising Aluminum Gallium Nitride on the multiple quantum well heterostructure opposite the first layer.

Many systems and methods can be used to store information in a spatially localized area of a heterostructure comprising ternary Group III–V Nitride semiconductor material according to the present invention. For example, a spot of ultraviolet radiation may be translated over the heterostructure comprising ternary Group III–V Nitride semiconductor material in a pattern representing the information. The pattern can be varied and the ultraviolet radiation dosage (energy and/or duration) may be varied at different spatially localized points in the pattern, to thereby reversibly change the properties of the heterostructure comprising ternary Group III–V Nitride semiconductor material in the pattern. Alternatively, multiple spaced apart spots may be impinged on the heterostructure comprising ternary Group III–V Nitride semiconductor material in a pattern representing the information. The dosage of each spot can also be varied. In yet another alternative, a spot of ultraviolet radiation can be sequentially impinged over the heterostructure comprising ternary Group III–V Nitride semiconductor material in a pattern of spaced apart spots. The dosage of each spot can be varied. Thus, an addressable memory having rows and columns may be provided, with the added variable that each spot at an intersection of a row and a column can also vary in intensity. Multibit storage thereby may be provided. Other impinging systems and methods can be used.

There are also many alternatives for generating the spatially localized ultraviolet radiation for writing onto the heterostructure comprising ternary Group III–V Nitride semiconductor material and for generating the blanket radiation to read the information that was written. Preferably, the same ultraviolet radiation source such as a laser is used for writing and reading. A focusing lens can be used to focus the ultraviolet radiation from the source onto the spatially localized area of the heterostructure comprising ternary Group III–V Nitride semiconductor material, to thereby reversibly change the properties thereof in the spatially localized area. A defocusing lens can be used to uniformly impinge the ultraviolet radiation from the source onto the heterostructure comprising ternary Group III–V Nitride semiconductor material during reading. Other optical systems including single or multiple sources can be used.

The information stored in the heterostructure comprising ternary Group III–V Nitride semiconductor material may represent analog or digital information to be stored. Moreover, the information may also comprise control information which is used to control an optical switch or an optical interconnect. Blanket radiation may be impinged onto the heterostructure comprising ternary Group III–V Nitride semiconductor material including onto the spatially localized area thereof, to thereby produce a spatial light modulator. In order to store the information in the heterostructure comprising ternary Group III–V Nitride semiconductor material in the desired spatially localized pattern, a converter may be provided to convert an information signal into a control signal such that the spatially localized optical radiation generating system is responsive to the control signal to impinge the spatially localized optical radiation onto a spatially localized area of the heterostructure comprising ternary Group III–V Nitride semiconductor material.

Accordingly, optical data storage may be provided in heterostructures comprising a ternary Group III–V Nitride semiconductor material with retention times that can last for hours, days, weeks or more. High density optical systems and methods, including information storage systems and methods may thereby be provided.

BRIEF DESCRIPTION OF THE DRAWINGS

FIG. 3 illustrates a first embodiment of a heterostructure according to the present invention.

FIG. 4 illustrates a second embodiment of a heterostructure according to the invention.

FIGS. 7A and 7B graphically illustrate relative output intensity versus wavelength for integrated heterostructures according to the present invention.

DETAILED DESCRIPTION OF PREFERRED EMBODIMENTS

Figure 1:
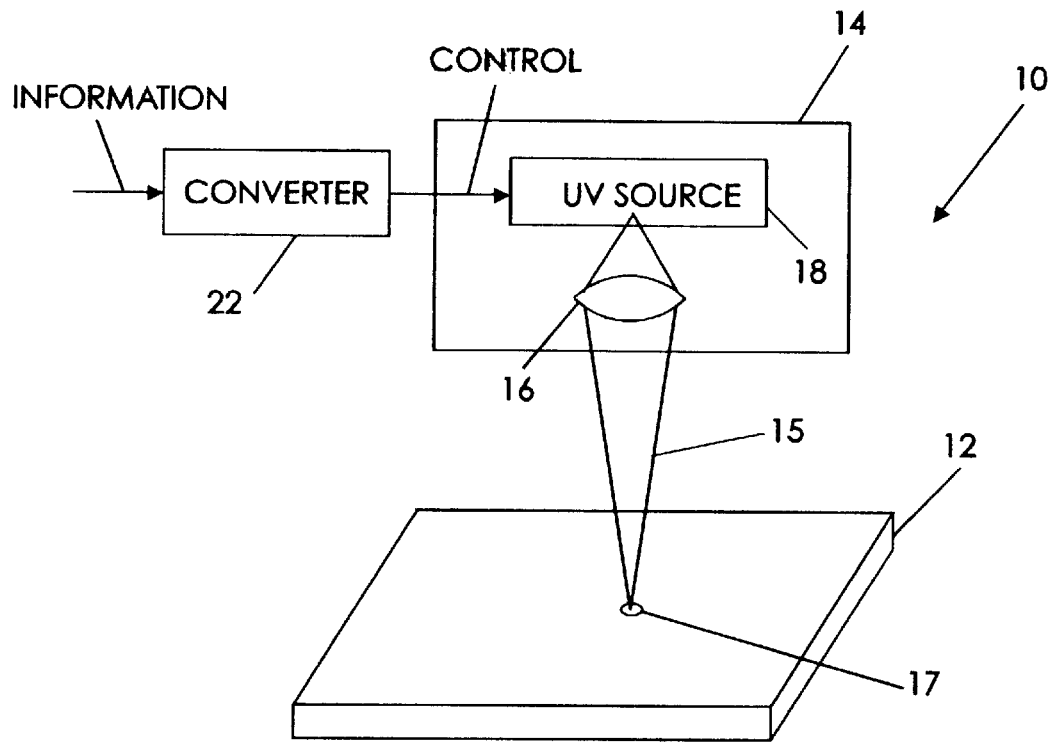
FIG. 1 illustrates systems and methods according to the invention in write mode.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will filly convey the scope of the invention to those skilled in the art. In the drawings, the thickness of layers and regions are exaggerated for clarity. Like numbers refer to like elements throughout. It will also be understood that when a layer is referred to as being "on" another layer or substrate, it can be directly on the other layer or substrate, or intervening layers may also be present.

Referring now to FIG. 1, systems and methods according to the invention will now be described. As shown in FIG. 1, system 10 includes a heterostructure 12 comprising a ternary Group III–V Nitride semiconductor material. It will be understood by those having skill in the art that the term "heterostructure" is used to indicate a monocrystalline structure including at least two layers of different materials. It will also be understood that a "ternary Group III–V Nitride semiconductor material" includes Indium Gallium Nitride (InGaN), Aluminum Gallium Nitride (AlGaN), and alloys thereof such as quaternary Group III–V Nitride semiconductor materials including but not limited to Indium Aluminum Gallium Nitride (InAlGaN). Specific embodiments of heterostructures 12 will be described in connection with FIGS. 3 and 4.

Still referring to FIG. 1, system 10 also includes a spatially localized optical radiation generating system 14 that impinges spatially localized optical radiation 15 onto a spatially localized area 17 of the heterostructure 12. According to the present invention, the spatially localized optical radiation 15 reversibly changes the properties of the heterostructure in the spatially localized area 17. The optical radiation is preferably visible or ultraviolet radiation, depending upon the bandgap of the ternary Group III–V nitride material. It will be understood by those having skill in the art that the spatially localized optical radiation generating system 14 preferably includes a source of ultraviolet or visible radiation 18, such as an ultraviolet laser, and a focusing lens 16 that focuses ultraviolet radiation from the source 18 onto the spatially localized area 17. The laser is preferably a short wavelength (between about 250 and 420 nm) laser, with energy greater than the bandgap of the ternary Group III–V Nitride material. It will be understood by those having skill in the art that many other embodiments of spatially localized optical radiation generating systems 14 may be provided.

Spatially localized optical radiation generating system 14 is used to impinge spatially localized radiation representing information to be stored onto the spatially localized area of the heterostructure. Accordingly, as illustrated in FIG. 1, in write mode, information is provided to a converter 22 that converts the information to be stored into a control signal that is applied to the spatially localized optical radiation generating system 14.

The information may be analog or digital information. The information can be stored in order to be read at a later time, as described in FIG. 2. Alternatively, the information can comprise control information for an optical switch or for a spatial light modulator. The design of optical switches and spatial light modulators are well known to those having skill in the art and need not be described further herein.

Figure 2:
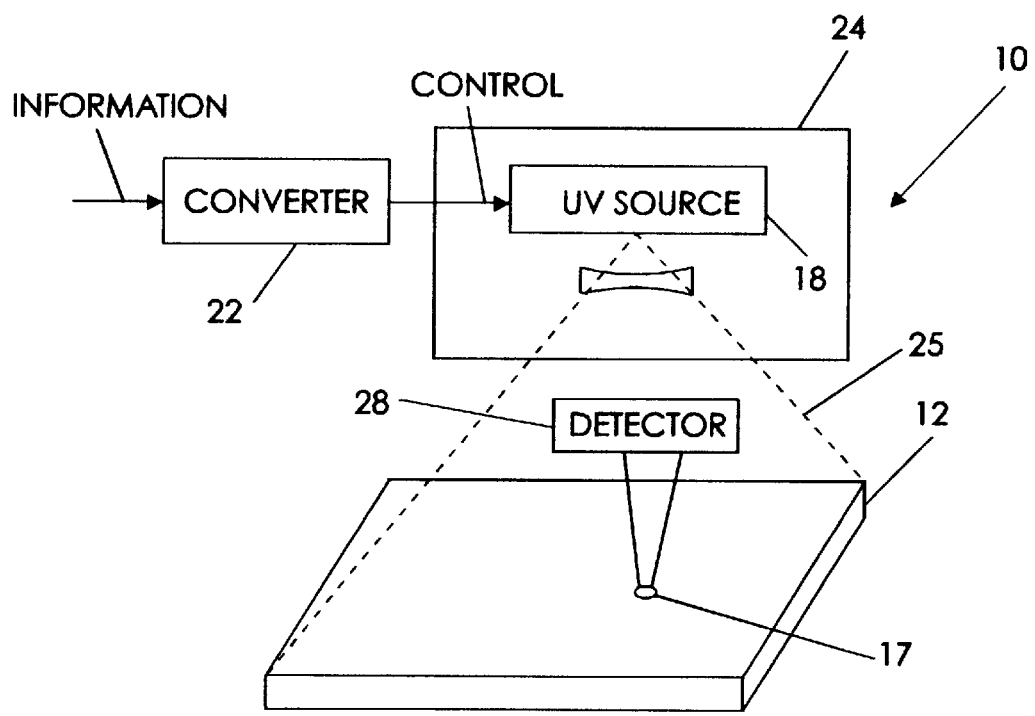
FIG. 2 illustrates systems and methods according to the invention in read mode.

FIG. 2 illustrates systems according to the present invention during read mode, to read the information which was previously stored during write mode (FIG. 1). As shown in FIG. 2, in order to write, a blanket radiation generating system 24 impinges blanket radiation 25 onto the heterostructure 12 including onto the spatially localized area 17. A detector 28, such as any conventional optical detector, is used to detect the changes in the properties of the heterostructure in the spatially localized area as a result of the impinged blanket radiation 25. For example, the blanket area of the heterostructure luminesces one color, while the spatially localized area luminesces another color. Other changes in the optical properties, such as changes in the index of refraction or absorption, may occur, which may be the basis for other optical devices such as spatial light modulators and optical interconnects. Change in electrical properties, such as mobility or conductivity may also occur.

Still referring to FIG. 2, it will be understood that blanket radiation generating system 24 may be the same system as spatially localized optical radiation generating system 14. In particular, the same source 18 is preferably used. However, rather than using a focusing lens 16 to focus the optical radiation, a defocusing lens 26 can be used to create blanket radiation 25 that is uniformly distributed over the heterostructure 12. It will also be understood that different sources can be used to read and write information. Preferably, the radiation source is a short wavelength ultraviolet laser, with a wavelength of between about 250 nm and 420 nm.

FIGS. 3 and 4 illustrate embodiments of heterostructures according to the present invention. In FIG. 3, a single heterostructure 12' comprising ternary Group III–V Nitride semiconductor material is shown. Referring to FIG. 3, the single heterostructure 12' includes a substrate 32, preferably a sapphire substrate, and a buffer layer 34, for example a 1.5 $\mu$m thick Gallium Nitride layer, on the substrate 32. A ternary Group III–V Nitride semiconductor material layer 36, for example a layer of Indium Gallium Nitride about 0.6 $\mu$m thick, is included on the buffer layer 34 opposite the substrate 32. In one embodiment, the Indium Gallium Nitride layer 36 may have the composition of $In_{0.14}Ga_{0.86}N$. The heterostructure may be fabricated using Metal Organic Chemical Vapor Deposition (MOCVD), Molecular Beam Epitaxy (MBE) or other semiconductor growth techniques.

FIG. 4 illustrates a multiple heterostructure 12". As shown, multiple heterostructure 12" includes a sapphire substrate 32 and a Gallium Nitride buffer layer 34. A plurality of quantum wells 42a–42n are also included. As shown, each quantum well includes a well of Indium Gallium Nitride surrounded by barrier layers of Gallium Nitride. A capping layer 44 of Aluminum Gallium Nitride may also be provided.

In a particular embodiment, the quantum wells may be formed of $In_{0.20}Ga_{0.80}N$ and may be 3 nm thick. The barrier layers may be layers of GaN 5 nm thick. The capping layer 44 may be 0.1 $\mu$m of $Al_{0.07}Ga_{0.93}N$, and the buffer layer 34 may be 2.5 $\mu$m of Gallium Nitride.

Figure 5:
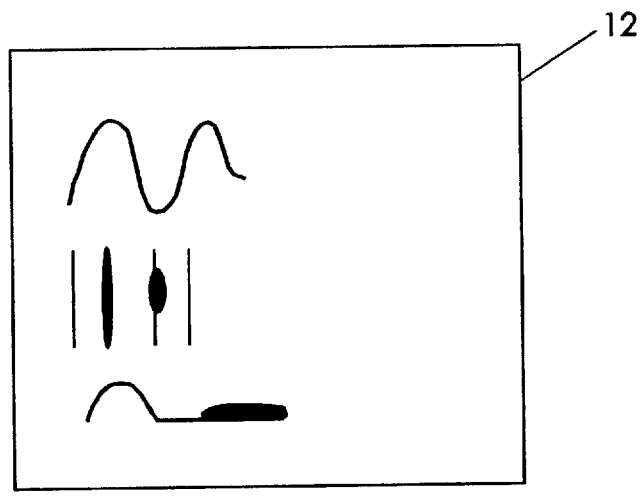
FIG. 5 illustrates a first embodiment of reversibly changed properties of a heterostructure in a spatially localized area according to the invention.
Figure 6:
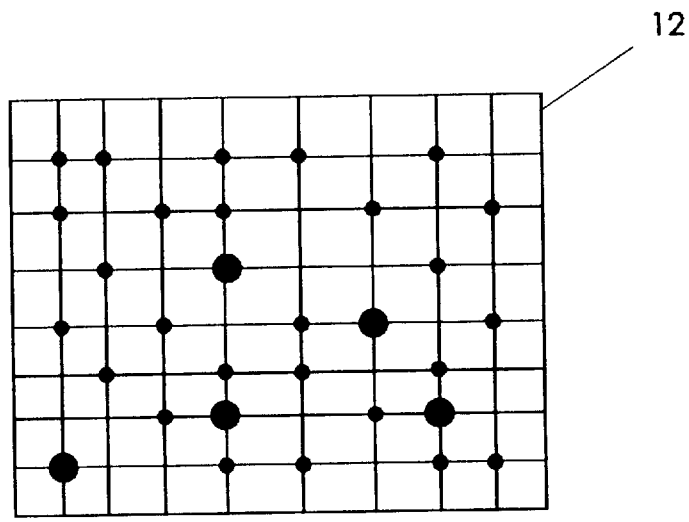
FIG. 6 illustrates a second embodiment of reversibly changed properties of a heterostructure in a spatially localized area according to the invention.

FIGS. 5 and 6 illustrate patterns of spatially localized areas which may be recorded on and read from heterostructures 12 according to the present invention. In particular, FIG. 5 illustrates analog patterns which may be recorded on a heterostructure 12. The analog patterns may be recorded by translating a spot of ultraviolet radiation over the heterostructure in a pattern representing the information to be stored. Multiple spots may also be used, either sequentially or simultaneously. Also, beams which are larger than spots, i.e. which have a definite length and/or width may also be used. Finally, as also illustrated in FIG. 5, the dosage of the beam may also be varied by varying the residence time and/or the intensity of the beam, to thereby provide high and low intensity storage areas. Thus, the location of the spatially localized areas and the intensity in the spatially localized areas may be varied.

FIG. 6 illustrates storage of digital information according to the present invention. As shown in FIG. 6, a plurality of spaced apart spatially localized areas may be written in the heterostructure 12. The spaced apart areas are preferably written in an array of rows and columns. Thus, the presence of a spot at an intersection of a row and a column may indicate a binary 1 and the absence of a spot may indicate a binary 0. The spots may be written sequentially or simultaneously.

Moreover, as also shown in FIG. 6, the dosage of the spots need not be uniform. Rather, some spots may be more intense than others by varying the intensity of the ultraviolet radiation and/or the residence time of the ultraviolet radiation, so that multiple digital values may be stored at a single spot. It will also be understood that combinations of analog and digital storage may be provided on the same heterostructure.

Additional details on the construction and operation of systems and methods according to the present invention will now be provided. The examples described below shall be viewed as illustrative and not as limiting.

According to an aspect of the invention, it has been found that high density, high contrast patterns can be written on InGaN/GaN heterostructures with light at room temperature and at cryogenic (77° K.) temperatures. After the pattern is erased, it appears that new information can be written on the same spot without degradation in efficiency or retention time. These effects can last more than four hours at room temperature and can have a much longer retention time at 77° K.

EXAMPLE 1

A single heterostructure 12' (FIG. 3) including a 60 nm unintentionally doped $In_{0.14}Ga_{0.86}N$ layer 36 grown on a 1.5 $\mu$m buffer layer of GaN 34 on a c-plane sapphire substrate 32 was used. No P-N junctions were formed. There were no morphological features observed under an optical microscope at magnifications up to 470 times. The heterostructure was fabricated using low pressure ($P_{tot}$=76–100 Torr) Metal Organic Chemical Vapor Deposition (MOCVD). A frequency tripled pulsed output of a Ti:Sapphire laser (250 fs pulse at 280 nm) was used as the radiation source. The heterostructure was mounted on a copper plug in a liquid nitrogen dewar such that measurements could be taken at 77° K. or room temperature. Pictures were taken with a 35 mm camera mounted on a microscope. A 400 nm long wavelength low pass filter was used in the microscope to protect the user's eyes from ultraviolet photoluminescence and laser light.

The optical quality of the sample was determined using photoluminescence. The room temperature CW photoluminescence peak was centered at 403 nm (14% Indium composition) with a Full Width of the Half Maximum (FWHM) of 19 nm. Pulsed photoluminescence taken at 77° K. with a frequency tripled Ti:Sapphire laser at a FWHM of 18 nm as shown in FIG. 7A and narrowed under increased pump levels to 3 nm as shown in FIG. 7B. The line narrowing and rapid increase in intensity is a strong indicator of high quality optical material and is also indicative of the onset of stimulated emission.

In read mode, the sample was illuminated with a low power density frequency tripled output of the Ti:Sapphire laser. The average power density was approximately 0.26 W $cm^{-2}$ (peak power of 1.4 kW $cm^{-2}$). An orange appearance resulted from viewing the luminescence through the filter mentioned above. A grainy appearance may result from scattered light from the unpolished side of the sapphire substrate and not from the epitaxial film which is smooth. To the naked eye under these conditions, the sample appeared purple-violet.

Writing of vertical lines on the heterostructure was accomplished by focusing the frequency tripled output of the Ti:Sapphire laser (280 nm) to a spot size of approximately 200 $\mu$m. The average power density in write condition was approximately 160 W $cm^{-2}$ (peak power density of 840 kW $cm^{-2}$). To write a pattern, the focused beam was manually translated across the surface of the sample using the X and Y micrometer screws on the focusing lens mount. Translating the lens slowly resulted in a bright, high contrast line. Translating the lens quickly resulted in a low contrast line, or no visible line at all. Less than 30 seconds was needed to make a single vertical line. Breaks in the line were due to the human operator not moving the micrometer smoothly and were not due to the material. These results suggest that the writing process is dosage (fluence) dependent.

A set of parallel vertical lines were written at room temperature. The sample was left under room lights at room temperature. Pictures were taken under the read conditions mentioned above after two, three and four hours. It was seen that the visible contrast between the written pattern and the unexposed area diminished with time. At the end of four hours, the lines were barely visible and were considered erased. After approximately eight hours at room temperature, no lines were visible and the sample appeared to be complete restored to its original state.

The ability to repeat the writing process on the same spot of the heterostructure was also demonstrated. A cross (X) was written on the same area as the vertical lines four hours after the vertical lines were written. The faint image of the vertical lines was used to ensure that the same area was being written on. The cross was then read, without degradation, under the read conditions described above. Thus, the ability to rewrite information was not degraded. This was confirmed numerous times.

No damage or change in the surface of the sample due to the writing process was observed. The possibility of photo induced etching was investigated during another write-read cycle using the same sample. The area on which information was written was examined under an optical microscope before and after immersion in HCl for 20 minutes. No damage or residual pattern was observed before or after the HCl immersion. After the HCl immersion, the optical pattern was still visible under read conditions. Thus, the changes in properties of the spatially localized area do not appear to be due to morphological (surface) changes.

The writing and retention times increase at 77° K. Under the same read conditions described above, the resulting background color viewed through the optical filter was purple, with the written areas appearing much lighter in shade, almost white. The contrast of the optically written pattern was substantially sharper than at room temperature. The retention time of the effect at 77° K. is much longer than that at room temperature.

While not wishing to be bound by any theory of operation, preliminary analysis indicates that the change in the optical properties of this high quality InGaN/GaN single heterostructure is associated with the creation or filling of trapping levels. Accordingly, the ability to write, store and read information with ultraviolet light on an InGaN/GaN heterostructure was demonstrated. The effect is quite strong and persists at room temperature for more than four hours.

EXAMPLE 2

According to another aspect of the present invention, it has been found that an exposure to a high power density UV light temporarily changes the optical properties a Multiple Quantum Well (MQW) heterostructure.comprising ternary Group III–V Nitride semiconductor material, such as an InGaN/GaN MQW. This effect was used to create high contrast optical patterns on the sample at room temperature and 77° K. The photo-induced changes were persistent for more than five days and three weeks for 12 and 20 Quantum Well (QW) samples, respectively. After the recorded pattern is erased, new information can be rewritten without a change in efficiency or retention time.

The MQW heterostructures 12" (FIG. 4) were grown on c-plane sapphire substrates 32 by atmospheric pressure MOCVD. The InGaN/GaN MQWs 42 were grown on a 2.5 $\mu$m thick GaN buffer layer 34. Structures including 12 and 20 MQWs were studied. The 12 MQW heterostructures had 3 nm thick InGaN quantum wells and 5 nm thick GaN barriers. The 20 MQW heterostructures included 2 nm thick InGaN quantum wells and 7 nm thick GaN barriers. No P-N junctions were present. Both heterostructures had 02 $\mu$m thick $Al_{0.07}Ga_{0.93}N$ capping layers 44. Heterostructures grown under the similar conditions usually have high quality distinct heterointerfaces, as confirmed by TEM.

As in Example 1, a frequency tripled output of a pulsed Ti:sapphire laser (250 fs at 280 nm) was used as the radiation source. The heterostructure was mounted on a copper plug in a liquid nitrogen dewar such that measurements could be taken at 77° K. or room temperature. An optical microscope was used to view the samples during the experiments. Photographs were taken with a 35 mm camera mounted on the microscope. A 400 nm long wavelength low pass filter was used in the microscope to protect the user's eyes from ultraviolet photoluminescence and laser light.

To write the optical pattern, the frequency tripled output of the Ti:sapphire laser was focused with a short focal length lens to a spot of approximately 200 $\mu$m in diameter. The resulting average power density was 160 W cm$^{-2}$. The focused laser light was translated across the surface of the heterostructure using the X-, and Y-micrometer translating screws of the focusing lens mount.

To read information, the heterostructure was illuminated with low intensity UV light form the same laser source. The excitation light beam was spatially expanded to uniformly illuminate the area of the heterostructure. The average power density under read conditions was less than 0.26 W cm$^{-2}$; 1.4 kW cm$^{-2}$ peak power density. The photoinduced optical patterns were viewed under the optical microscope.

Figure 8:
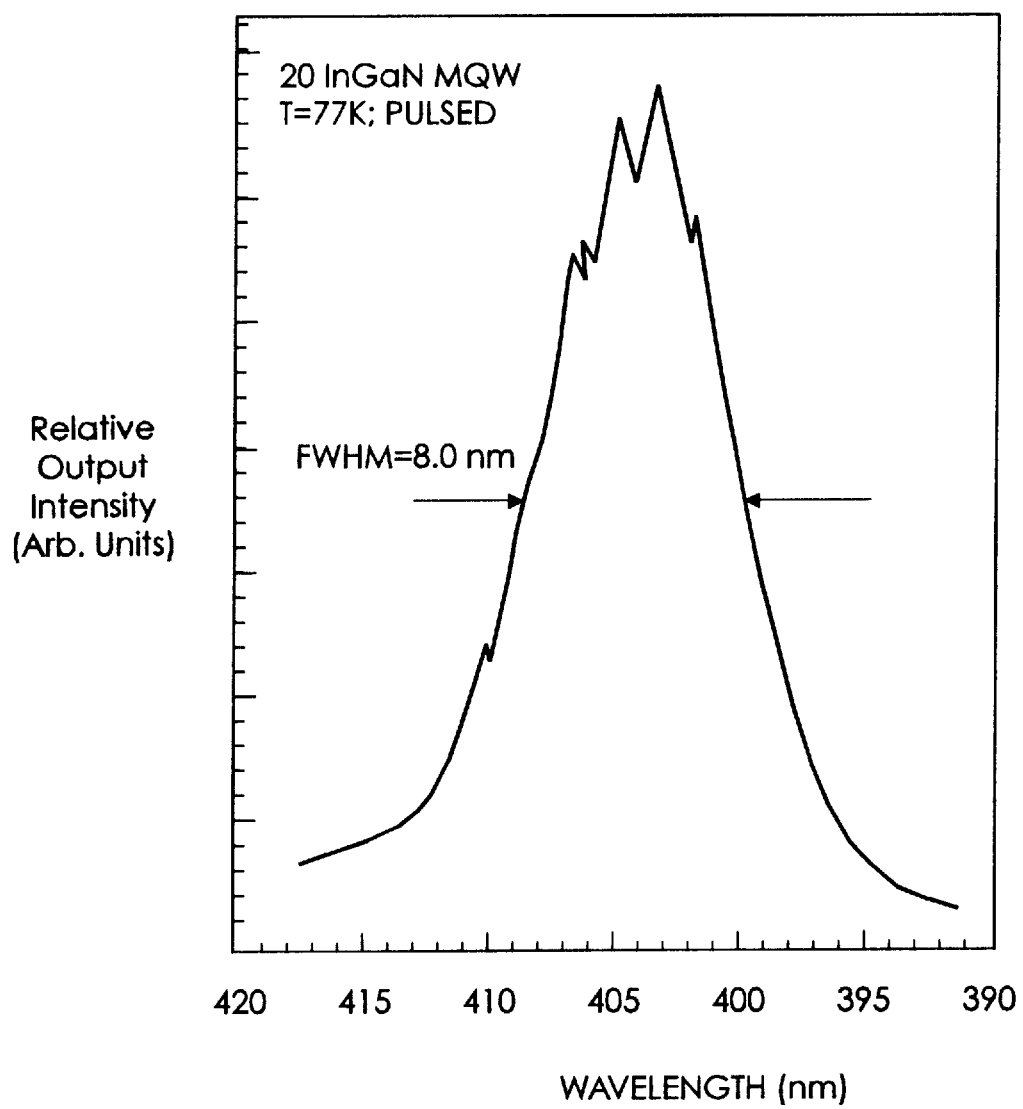
FIG. 8 graphically illustrates relative output intensity versus wavelength for multiple quantum well heterostructures according to the present invention.

The optical quality of the samples was evaluated using pulsed photoluminescence. 77° K. pulsed photoluminescence results from the 20 QW sample are shown in FIG. 8. The output emission is centered at 404 nm and has a FWHM of 8.0 nm. At least five modes can be found in the output emission spectrum, which is consistent with feedback from a low Q (quality factor) 15 $\mu$m cavity defined by reactive ion etching (RIE). The 12 MQW sample was of comparable optical quality.

A set of dark blue intersecting lines was recorded on the 12 MQW heterostructure at room temperature under the write conditions described above. The heterostructure was then cooled to 77° K. and another set of lines was written on the area of the heterostructure below the first pattern. This set of lines was higher in contrast, while the set of lines written at room temperature was still clearly visible. After fives days at room temperature under the room lights, the pattern was no longer distinguishable to the eye and appeared to be completely restored to its original condition. After the photo-induced pattern was self-erased, a new pattern (a set of intersecting lines) was written again on the same area of the heterostructure with no apparent change in efficiency of retention time.

A set of parallel lines was also written on the 20 QW heterostructure. It took less than two seconds to create a line. Such short time exposure resulted in a yellow-white pattern on a bright blue background, as seen under the optical microscope under read conditions. The ratio between exposure times used to create each of the lines was varied as 2:4:8:16:32:64:128 from left to right. Since the power density of the incident UV light was kept constant in write conditions, the doubling in exposure time resulted in a proportional increase in dosage.

The longer exposure time (higher dosage) resulted in a deeper contrast between the photoinduced pattern and the background. The color of the pre-exposed areas of the sample changes from yellow-whitish to almost transparent with increasing dosage, as seen by a human operator under the optical microscope. No degradation in the luminescence efficiency of the photoluminescence, as observed by the human operator, was detected during the time of exposure to the high intensity UV laser light in write conditions. This was confirmed numerous times with exposures of up to several minutes.

Another optical pattern was created on the 20 MQW heterostructure to monitor the retention time. After four weeks, the pattern was still present on the heterostructure without a significant degradation in contrast. This suggests that the retention time for the 20 QW InGaN/GaN heterostructure at room temperature is longer than four weeks. The effect is more dramatic at 77° K., where the increase of the output emission from the sample provides even higher contrast between the pattern and the background. The retention time at 77° K. is much longer.

As in Example 1, to verify that the observed changes were not related to photoetching of the heterostructure, the heterostructures were thoroughly studied under an optical microscope at a magnification of 470 x. No damage or morphological features consistent with photoinduced patterns were observed under the microscope. The written patterns, though not visible in the optical microscope under incandescent light, were still readable when viewed under the read conditions.

Thus, the optical properties of high quality InGaN/GaN MQW heterostructures can be modified by an exposure to high intensity UV light. While not wishing to be bound by any theory of operation, this effect may be associated with the creation or filling of tapping levels. An increase in contrast and retention time as a function of the number of quantum wells in heterostructure was also observed.

Accordingly, the ability to locally change the properties of high quality multiple InGaN/GaN quantum wells has been demonstrated. The reconfigurable optical properties were used to write, store and read information with ultraviolet light on the samples. The effect is persistent for more than five days for 12 MQW heterostructures and more than four weeks for 20 MQW heterostructures. The effects of the invention can be applied to optical data storage and to other photonic devices such as spatial light modulators used in optical correlators and optical interconnects.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An information storage method comprising the step of: impinging spatially localized optical radiation representing the information onto a spatially localized area of a heterostructure comprising a ternary Group III–V Nitride semiconductor material to thereby reversibly change the properties of the heterostructure comprising a ternary Group III–V Nitride semiconductor material in the spatially localized area.

2. A method according to claim 1 further comprising the steps of:
impinging blanket radiation onto the heterostructure comprising a ternary Group III–V Nitride semiconductor material including onto the spatially localized area thereof; and
simultaneously detecting the changes in the properties of the heterostructure comprising a ternary Group III–V Nitride semiconductor material in the spatially localized area as a result of the impinged blanket radiation, to thereby read the information.

3. A method according to claim 1 wherein the impinging step comprises the step of translating a spot of ultraviolet radiation over the heterostructure comprising a ternary Group III–V Nitride semiconductor material in a pattern representing the information to thereby reversibly change the properties of the heterostructure comprising a ternary Group III–V Nitride semiconductor material in the pattern.

4. A method according to claim 3 wherein the impinging step further comprises the step of translating a spot of ultraviolet radiation over the heterostructure comprising a ternary Group III–V Nitride semiconductor material in a pattern and at dosages representing the information to thereby reversibly change the properties of the heterostructure comprising a ternary Group III–V Nitride semiconductor material in the pattern.

5. A method according to claim 1 wherein the impinging step comprises the step of impinging a plurality of spaced apart spots of ultraviolet radiation on the heterostructure comprising a ternary Group III–V Nitride semiconductor material in a pattern representing the information to thereby reversibly change the properties of the heterostructure comprising a ternary Group III–V Nitride semiconductor material in the pattern.

6. A method according to claim 5 wherein the impinging step further comprises the step of impinging a plurality of spaced apart spots of ultraviolet radiation on the heterostructure comprising a ternary Group III–V Nitride semiconductor material in a pattern and at dosages representing the information to thereby reversibly change the properties of the heterostructure comprising a ternary Group III–V Nitride semiconductor material in the pattern.

7. A method according to claim 1 wherein the impinging step comprises the step of sequentially impinging a spot of ultraviolet radiation over the heterostructure comprising a ternary Group III–V Nitride semiconductor material in a pattern of spaced apart spots representing the information to thereby reversibly change the properties of the heterostructure comprising a ternary Group III–V Nitride semiconductor material in the pattern.

8. A method according to claim 5 wherein the impinging step further comprises the step of impinging a spot of ultraviolet radiation over the heterostructure comprising a ternary Group III–V Nitride semiconductor material in a pattern of spaced apart spots and at dosages representing the information to thereby reversibly change the properties of the heterostructure comprising a ternary Group III–V Nitride semiconductor material in the pattern.

9. A method according to claim 2 wherein the step of impinging blanket radiation comprises the step of impinging blanket ultraviolet radiation of same frequency as the spatially localized ultraviolet radiation onto the heterostructure comprising a ternary Group III–V Nitride semiconductor material including onto the spatially localized area thereof.

10. A method according to claim 1 wherein the heterostructure comprising a ternary Group III–V Nitride semiconductor material comprises a single heterostructure of ternary Group III–V Nitride semiconductor materials.

11. A method according to claim 1 wherein the heterostructure comprising a ternary Group III–V Nitride semiconductor material comprises a multiple heterostructure of ternary Group III–V Nitride semiconductor materials.

12. A method according to claim 10 wherein the single heterostructure is a heterostructure of Indium Gallium Nitride and Gallium Nitride.

13. A method according to claim 11 wherein the multiple heterostructure is a multiple quantum well of Indium Gallium Nitride and Gallium Nitride.

14. A method according to claim 1 further comprising the step of impinging blanket radiation onto the heterostructure comprising a ternary Group III–V Nitride semiconductor material including onto the spatially localized area thereof to thereby produce spatial light modulation.

15. A method according to claim 1 wherein the information comprises control information for an optical switch.

16. A method according to claim 1 wherein the spatially localized optical radiation is selected from the group consisting of visible radiation and ultraviolet radiation.

17. An optical system comprising:
a heterostructure comprising a ternary Group III–V Nitride semiconductor material; and
a spatially localized optical radiation generating system that impinges spatially localized optical radiation onto a spatially localized area of the heterostructure comprising a ternary Group III–V Nitride semiconductor material to thereby reversibly change the properties of the heterostructure comprising a ternary Group III–V Nitride semiconductor material in the spatially localized area.

18. A system according to claim 17 further comprising:
a blanket radiation generating system that impinges blanket radiation onto the heterostructure comprising a ternary Group III–V Nitride semiconductor material including onto the spatially localized area thereof; and
a detecting system that is responsive to the blanket radiation generating system to detect the changes in the properties of the heterostructure comprising a ternary Group II–V Nitride semiconductor material in the spatially localized area as a result of the impinged blanket radiation.

19. A system according to claim 17 wherein the spatially localized optical radiation generating system comprises a system that translates a spot of ultraviolet radiation over the heterostructure comprising a ternary Group III–V Nitride semiconductor material in a pattern to thereby reversibly change the properties of the heterostructure comprising a ternary Group III–V Nitride semiconductor material in the pattern.

20. A system according to claim 19 wherein the spatially localized optical radiation generating system comprises a system that translates a spot of ultraviolet radiation over the heterostructure comprising a ternary Group III–V Nitride semiconductor material in a pattern and at variable doses to thereby reversibly change the properties of the heterostructure comprising a ternary Group III–V Nitride semiconductor material in the pattern.

21. A system according to claim 17 wherein the spatially localized optical radiation generating system comprises a system that impinges a plurality of spaced apart spots of ultraviolet radiation over the heterostructure comprising a ternary Group III–V Nitride semiconductor material in a pattern to thereby reversibly change the properties of the heterostructure comprising a ternary Group III–V Nitride semiconductor material in the pattern.

22. A system according to claim 21 wherein the spatially localized optical radiation generating system comprises a system that impinges a plurality of spaced apart spots of ultraviolet radiation over the heterostructure comprising a ternary Group III–V Nitride semiconductor material in a pattern and at variable doses to thereby reversibly change the properties of the heterostructure comprising a ternary Group III–V Nitride semiconductor material in the pattern.

23. A system according to claim 17 wherein the spatially localized optical radiation generating system comprises a system that impinges a spot of ultraviolet radiation over the heterostructure comprising a ternary Group III–V Nitride semiconductor material in a pattern of spaced apart spots to thereby reversibly change the properties of the heterostructure comprising a ternary Group III–V Nitride semiconductor material in the pattern.

24. A system according to claim 23 wherein the spatially localized optical radiation generating system comprises a system that impinges a spot beam of ultraviolet radiation over the heterostructure comprising a ternary Group III–V Nitride semiconductor material in a pattern of spaced apart spots of variable doses to thereby reversibly change the properties of the heterostructure comprising a ternary Group III–V Nitride semiconductor material in the pattern.

25. A system according to claim 18 further comprising a source of ultraviolet radiation;
wherein the spatially localized optical radiation generating system comprises a focusing lens that focuses ultraviolet radiation from the source onto a spatially localized area of the heterostructure comprising a ternary Group III–V Nitride semiconductor material to thereby reversibly change the properties of the heterostructure comprising a ternary Group III–V Nitride semiconductor material in the spatially localized area; and
wherein the blanket radiation generating system comprises an optical system that uniformly impinges ultraviolet radiation from the source onto the heterostructure comprising a ternary Group III–V Nitride semiconductor material including onto the spatially localized area thereof.

26. A system according to claim 17 wherein the heterostructure comprising a ternary Group III–V Nitride semiconductor material comprises a single heterostructure of ternary Group III–V Nitride semiconductor materials.

27. A system according to claim 17 wherein the heterostructure comprising a ternary Group III–V Nitride semiconductor material comprises a multiple heterostructure of ternary Group III–V Nitride semiconductor materials.

28. A system according to claim 26 wherein the single heterostructure is a heterostructure of Indium Gallium Nitride and Gallium Nitride.

29. A system according to claim 26 wherein the single heterostructure comprises:
a substrate;
a first layer comprising Gallium Nitride on the substrate; and
a second layer comprising Indium Gallium Nitride on the first layer opposite the substrate.

30. A system according to claim 27 wherein the multiple heterostructure is a multiple quantum well of Indium Gallium Nitride and Gallium Nitride.

31. A system according to claim 27 wherein the multiple heterostructure comprises:
a substrate;
a first layer comprising Gallium Nitride on the substrate;
a multiple quantum well of Indium Gallium Nitride and Gallium Nitride on the first layer; and a second layer comprising Aluminum Gallium nitride on the multiple quantum well, opposite the first layer.

32. A system according to claim 17 further comprising:

a blanket radiation generating system that impinges blanket radiation onto the heterostructure comprising a ternary Group III–V Nitride semiconductor material including onto the spatially localized area thereof to thereby produce a spatial light modulator.

33. A system according to claim 17 further comprising:

a converter that converts an information signal into a control signal, the spatially localized optical radiation generating system being responsive to the control signal to impinge spatially localized optical radiation onto a spatially localized area of the heterostructure comprising a ternary Group III–V Nitride semiconductor material to thereby reversibly change the properties of the heterostructure comprising a ternary Group III–V Nitride semiconductor material in the spatially localized area.

34. A system according to claim 33 wherein the information signal is an analog information signal.

35. A system according to claim 33 wherein the information signal is a digital information signal.

36. A system according to claim 33 wherein the information signal is a switching control signal.

37. A system according to claim 17 wherein the spatially localized optical radiation generating system is selected for the group consisting of a spatially localized visible radiation generating system and a spatially localized ultraviolet radiation generating system.

* * * * *